United States Patent [19]
Velardo

[11] 3,805,564
[45] Apr. 23, 1974

[54] LOCK UNIT FOR BICYCLE OR MOTORCYCLE

[75] Inventor: Theodore A. Velardo, Waltham, Mass.

[73] Assignee: Raymond Lee Organization, Inc., New York, N.Y.; a part interest

[22] Filed: July 31, 1972

[21] Appl. No.: 276,763

[52] U.S. Cl............................ 70/18, 70/54, 70/233
[51] Int. Cl....................... E05b 67/38, E05b 73/00
[58] Field of Search............... 70/14, 15, 18, 54, 55, 70/56, 57, 58, 225, 226, 227, 233, 234, 236

[56] References Cited
UNITED STATES PATENTS
1,453,882  5/1923  McHugh ............................... 70/18

FOREIGN PATENTS OR APPLICATIONS
228,146  5/1925  Great Britain ......................... 70/18
371,514  3/1923  Germany ............................... 70/18
175,600  5/1935  Switzerland ........................... 70/14

Primary Examiner—Robert L. Wolfe
Attorney, Agent, or Firm—Howard I. Podell

[57] ABSTRACT

A locking device particularly suited for locking a bicycle or motorcycle to a fixed post, and for locking the wheels of said vehicle. The device consists of a U-shaped shackle member which is engaged by a pair of parallel holes in the lock casing member. One or more pairs of locking holes are located in one leg of the shackle and oriented at right angles to the axis of the shackle leg, being spaced apart and of the diameter to receive a U-shaped hasp of a conventional lock. The lock casing member has a pair of matching locking holes located at right angles to the axis of the shackle hole in the lock casing.

3 Claims, 5 Drawing Figures

PATENTED APR 23 1974 3,805,564
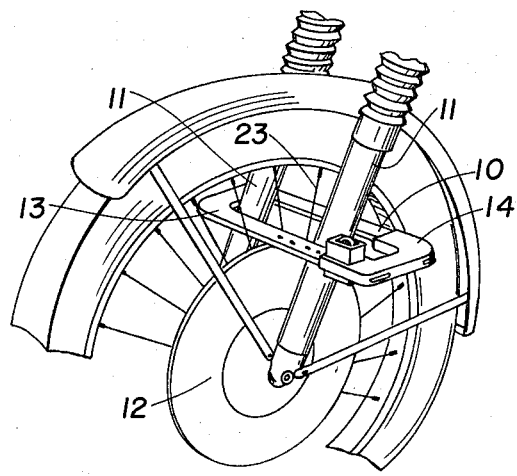
FIG.5
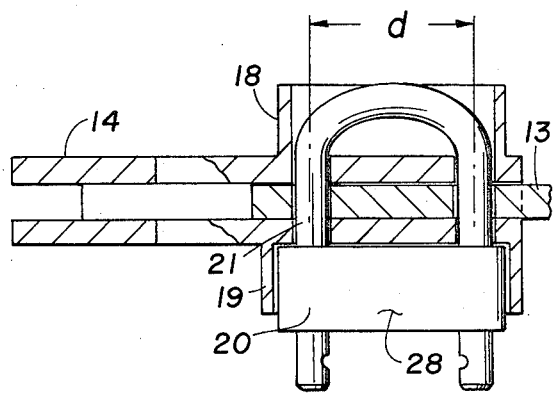
FIG.4
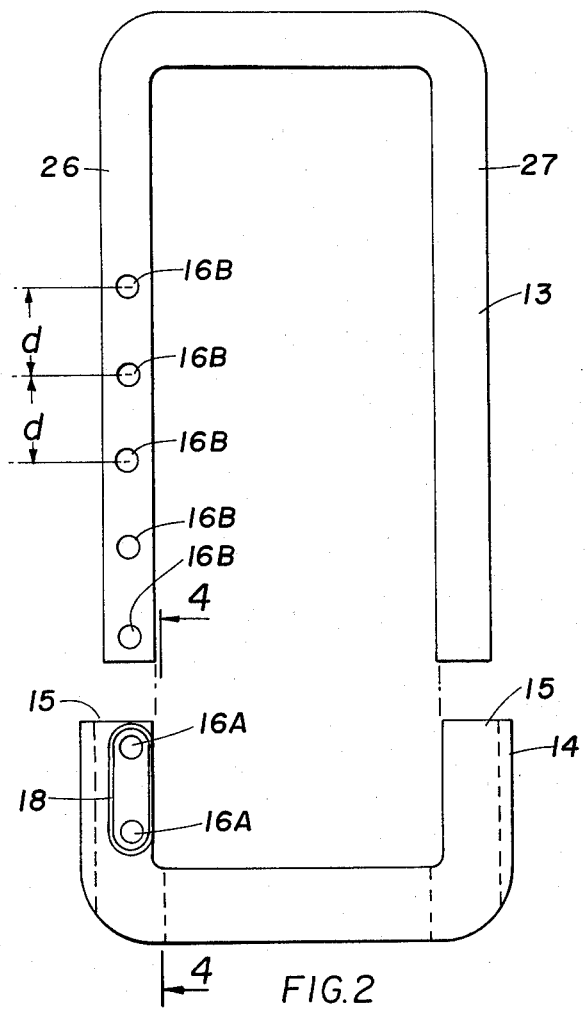
FIG.2
FIG.3
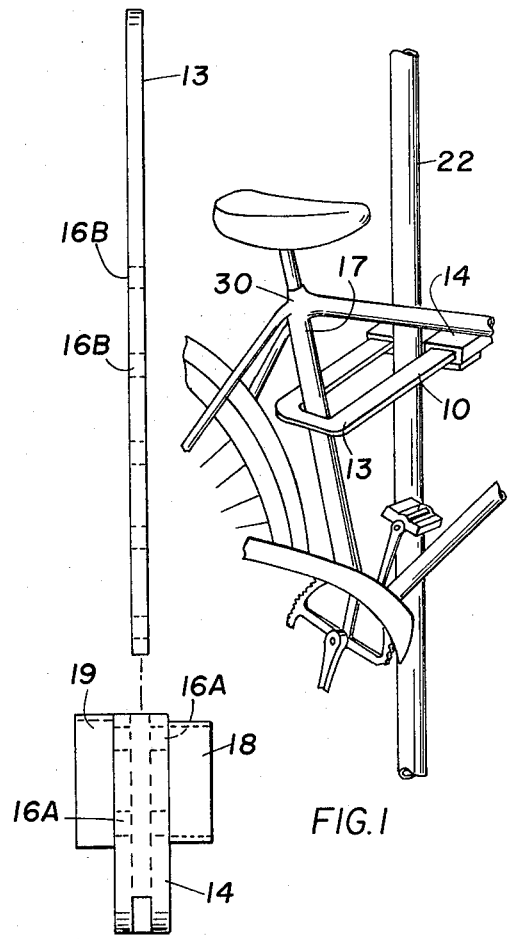
FIG.1

LOCK UNIT FOR BICYCLE OR MOTORCYCLE

SUMMARY OF THE INVENTION

This invention relates to a deivce for the locking of a bicycle or motorcycle, and preferably to a device which may serve to lock a wheel of such a vehicle to a fixed post.

An advantage of this device is that it may be employed in combination with many conventional locks to secure a bicycle or motorcycle. The device is readily fastened to the frame of the vehicle when it is not in use, and is of simple and inexpensive construction.

The device consists of a U-shaped shackle which fits into parallel holes in a casing. Both casing and shackle have one pair of matching locking holes which are mounted at right angles to the axis of a shackle leg for the installation of a conventional U-shaped hasp lock. The shackle leg may have several such pairs of locking holes to provide adjustable locking lengths of the shackle in the lock casing.

BRIEF DESCRIPTION OF THE DRAWING

The objects and features of the invention may be understood with reference to the following detailed description of an illustrative embodiment of the invention, taken together with the accompanying drawing in which:

FIG. 1 is a perspective view of a bicycle locked to a fixed post by the device;

FIG. 2 is a plan view, in exploded form, of the device;

FIG. 3 is a side view, in exploded form, of the device;

FIG. 4 is a sectional view of the device fastened by a conventional hasp lock; and FIG. 5 is a perspective view of a motorcycle wheel locked by the device.

DESCRIPTION OF THE PREFERRED EMBODIMENT

Turning now descriptively to the drawing, in which similar reference characters denote similar elements throughout the several views, FIG. 1 illustrates a bicycle 30 which is secured by the locking device 10, with the shackle 13 of the device 10 firmly securing the frame member 17 of the bicycle 30 to a fixed vertical pole 22. FIG. 5 illustrates an alternate means of employing the device 10 to lock the wheel 12 of a motorcycle, with the locking device shackle 13 enclosing wheel spokes 23 and the fixed vehicle wheel mounting members 11.

As shown in FIG. 2-4, the shackle 13 is of U-form with one leg 26 fitted with locking holes 16B which are spaced apart a uniform distance d, said distance d being the spacing of the legs 21 of a hasp lock 20, with the diameter of said holes 16B being of a slightly larger size than the diameter of the legs 21 of hasp lock 20. Locking holes 16B are preferably installed at right angles to the axis of shackle leg 26.

Lock casing 14 is formed with two holes 15 to mate with shackle legs 26 and 27, and with a pair of locking holes 16A mounted at right angles to the axis of one casing shackle hole 15 so as to line up with a pair of locking holes 16B on shackle leg 26, when shackle leg 26 is in casing shackle hole 15. Holes 16A are preferably of similar diameter and spacing as a pair of holes 16 B on shackle leg 26. A rim shielding 18 surrounds the locking holes 16A on one face of the casing 14, said shielding 18 being at right angles to the face of the casing 14 and adaptable for protecting the hasp 21 of lock 20 from being cut. A larger shielding rim 19 may be placed about the other face of the casing 14 to surround the body 28 of lock 20 and to prevent the cutting of the lock hasp 21 as it enters the lock body 28.

The lock shackle 13 and the casing 14 may both be coated by a plastic material such as polyethylene or teflon to prevent the scratching by the device of the vehicle body. The shackle 13 is preferably formed of hardened steel material or of hardened die cast material.

Since obvious changes may be made in the specific embodiment of the invention described herein, it is indicated that all matter contained herein is intended as illustrative and not as limiting in scope.

Having thus described my invention, what I claim as new and desire to secure by letters Patent of the United States is:

1. A locking device particularly suited for the securing of a bicycle or motorcycle to a fixed post or to the locking of a wheel of such a vehicle to the vehicle frame, consisting of a U-shaped shackle member which fits into a pair of parallel holes in the lock casing body, with locking means to secure said shackle in said lock casing body, in which a pair of locking holes are located in one leg of the shackle, at right angles to the axis of the shackle, with a similar pair of matching locking holes located in the lock casing body at right angles to the axis of a shackle hole in the lock casing body, and spaced so as to align with the locking holes of the shackle leg, when said shackle member is engaged in the lock casing body, all said locking holes being of similar diameters and being spaced so as to receive a U-shaped hasp of a hasp lock.

2. The combination as recited in claim 1 in which a shielding rim is located on the external surface of one face of the lock casing body surrounding the pair of locking holes so as to prevent the cuttng of a lock hasp which passes through said locking holes, said shielding rim being shaped so as to enclose the legs of the lock hasp installed in the lock casing body.

3. The combination as recited in claim 2 in which a second shielding rim is located on the other face of the lock casing body, said shielding rim being of a size to enclose the lock body of a hasp lock so as to prevent the cutting of the lock hasp where it enters the lock body.

* * * * *